US012770320B2

(12) United States Patent
Dal

(10) Patent No.: US 12,770,320 B2
(45) Date of Patent: Oct. 20, 2026

(54) OCCLUSION CULLING TECHNIQUE FOR POINT CLOUD VISUALIZATION

(71) Applicant: HEXAGON INNOVATION HUB GMBH, Heerbrugg (CH)

(72) Inventor: Lars Andreas Dal, Oslo (NO)

(73) Assignee: HEXAGON INNOVATION HUB GMBH, Heerbrugg (CH)

( * ) Notice: Subject to any disclaimer, the term of this patent is extended or adjusted under 35 U.S.C. 154(b) by 134 days.

(21) Appl. No.: 18/952,661

(22) Filed: Nov. 19, 2024

(65) Prior Publication Data

US 2025/0200870 A1 Jun. 19, 2025

(30) Foreign Application Priority Data

Dec. 13, 2023 (EP) .................................... 23216452

(51) Int. Cl.
*G06T 15/40* (2011.01)

(52) U.S. Cl.
CPC .................................. *G06T 15/405* (2013.01)

(58) Field of Classification Search
CPC ... G06T 15/405; G06T 2210/56; G06T 15/40; G06T 15/005; G06T 17/20; G06T 2207/10028
See application file for complete search history.

(56) References Cited

U.S. PATENT DOCUMENTS

2014/0354634 A1* 12/2014 Amsinck ............... G06T 15/405 345/420
2018/0225829 A1* 8/2018 Evertt ..................... A63F 13/53
2023/0026813 A1* 1/2023 Tang ........................ G06T 15/20
2023/0298133 A1* 9/2023 Tovey ................... G06T 3/4053 382/299
2023/0377178 A1* 11/2023 Fuller ..................... G06T 15/80

OTHER PUBLICATIONS

Schütz, M. et al., "Rendering Point Clouds with Compute Shaders and Vertex Order Optimization," Techreport, pp. 1-18 (Apr. 15, 2021).
Pesce Angelo, "C0DE517E: Half baked: Dynamic Occlusion Culling," (Mar. 15, 2023).
Extended European Search Report dated Aug. 21, 2024 as received in Application No. 23216452.5.

* cited by examiner

*Primary Examiner* — Kee M Tung
*Assistant Examiner* — Nauman U Ahmad
(74) *Attorney, Agent, or Firm* — Maschoff Brennan

(57) ABSTRACT

A method for visualizing a point cloud on a display, wherein the visualizing includes changing an observation point onto the point cloud and efficient handling of changes in points of the point cloud that are differently obscured for different observation points. The method comprises occlusion culling testing using a depth buffer for sampling a first depth from a previous observation point associated with a previous frame towards the tested point to determine whether the tested point was visible or occluded when viewed from the previous observation point. If the tested point is determined to be occluded when viewed from the previous observation point, a heuristic testing is carried out as part of the occlusion culling testing to determine if the change in observation point since the previous frame is likely to have revealed the previously covered point to be visible from the new observation point.

20 Claims, 1 Drawing Sheet

OCCLUSION CULLING TECHNIQUE FOR POINT CLOUD VISUALIZATION

BACKGROUND

The present disclosure relates to a method for visualizing a point cloud on a display of a computing device, wherein the visualizing includes changing an observation point onto the point cloud and efficient handling of changes in points of the point cloud that are differently obscured for different observation points.

Unwanted overdrawing of points of a point cloud occurs when multiple points essentially located along the same viewing axis but at different depths from the observation point are visualized. During visualization, such points (also referred to as points on screen) fall into the same pixel or into closely neighboring pixels. So-called occlusion culling is an industry standard way of mitigating overdraw, e.g. to prevent unnecessary work by the graphics card for updating the same pixel or pixel area multiple times, e.g. to avoid memory contention that would slow down the rendering.

Occlusion culling works by performing an occlusion test before rendering an object to screen to determine if the object would be occluded by other geometry in the scene. Objects that are deemed to be occluded are skipped from rendering. When changing the observation point, occlusion states can change, i.e. points previously covered when viewing onto the point cloud from a previous observation point become visible from a new observation point and previously visible points become covered when changing the observation point. Changing the observation point is often also referred to as changing the frame, wherein each frame represents the point cloud as seen from a corresponding observation point.

Many approaches exist for determining if a point is occluded. By way of example, a state-of-the-art technique involves to first render all objects that were visible in the last frame, and to generate a hierarchical depth buffer from the resulting depth buffer. A hierarchical depth buffer is a depth texture with mip maps, where each mip level is generated using the maximum depth of any sub-pixel to make occlusion tests conservative. After generating the hierarchical depth buffer, all objects are occlusion tested against the hierarchical depth buffer, and any objects found to be visible that haven't already been rendered are now rendered. To test whether an object is occluded, the hierarchical depth map is sampled at the position of the object, at a mip level where each texel is large enough to cover the entire object.

Typical occlusion culling techniques like the one described above have several shortcomings when processing/visualizing a point cloud. As point clouds tend to have numerous gaps, they make poor occluders, and rarely fully occlude objects behind them. Moreover, while triangle mesh geometry typically consists of separate objects with well-fitting bounding boxes that can be occlusion tested individually, point clouds are typically provided with so-called LOD (level-of-detail) structures where the points are sectioned into pre-defined volumes. For instance, European patent application with application number EP23216367.5 filed by the same applicant discloses a method that comprises performing a level-of-detail selection on a multitude of indexed data sets which are not necessarily aligned with respect to each other. Groupings of points into pre-defined volumes will often comprise pieces of disconnected objects, with a combined bounding box that contains large amounts of empty space, making them less likely to be fully occluded.

SUMMARY

It is therefore an object of the present disclosure to provide an improved method for visualizing a point cloud.

A further object is to provide more efficient visualization of a point cloud while maintaining a visually correct view of the scene when being represented by a current frame of the point cloud.

The disclosure relates to a computer-implemented method for visualizing different frames of a point cloud using a computing device having limited memory, wherein each of the different frames represents the point cloud as seen from a corresponding observation point. The method comprises occlusion culling testing of points of the point cloud to determine which points of the point cloud should be culled for the visualizing of the frames. In the following, a point of the point cloud tested by the occlusion culling testing with respect to visualizing of one of the frames is referred to as the tested point and the one of the frames is referred to as the tested frame.

The occlusion culling testing comprises use of a depth buffer providing depth information from a previous frame (a frame preceding the tested frame when changing observation points onto the point cloud). For example, the depth information provides information of distances (also referred to as depths) along lines from the observation point of the previous frame to the points of the point cloud, wherein the distances indicate positions of first encounters with a geometry that blocks the view from the observation point onto a respective point of the point cloud further down the respective line. For the tested point, the occlusion culling testing comprises using the depth buffer for sampling a first depth from a previous observation point associated with a previous frame towards the tested point to determine whether the tested point was visible or occluded when viewed from the previous observation point. If the tested point is determined to be occluded when viewed from the previous observation point, a heuristic testing is carried out as part of the occlusion culling testing to determine if the change in observation point since the previous frame is likely to have revealed the (previously covered) point to be visible from the new (later) observation point.

The heuristic testing comprises calculating a position of a first depth point that corresponds to the first depth. The first depth point is located on a line from the previous observation point through the tested point or through a position in close proximity to the tested point, e.g. wherein the position in close proximity is used to mitigate numerical precision issues (see below). For example, the position in close proximity is less than a point diameter away from the tested point.

The heuristic testing further comprises calculating a position of a sampling point on a line from the observation point associated with the tested frame (the observation point from which the point cloud being represented by the tested frame is observed from) to the tested point, wherein a distance from the tested point to the sampling point equals a distance from the tested point to the first depth point multiplied by a factor between 0.75 and 1.25. For example, a difference in the distance from the tested point to the sampling point and the distance from the tested point to the first depth point is chosen to be small compared to the distance from the tested point to the first depth point. In particular, the distance from the tested point to the sampling point equals a distance from the tested point to the first depth point multiplied by a factor between 0.9 and 1.1. More particularly, the distance from the tested point to the sampling point equals the distance between the tested point and the first depth point.

By way of example, the computer-implemented method is configured to provide different settings of the factor to be multiplied with the distance from the tested point to the first depth point, e.g. wherein the method comprises a setting of the factor. The factor may be freely settable within the range of 0.75 and 1.25 and/or a selectable set of fixed factors is provided to be selected by a user.

The heuristic testing further comprises sampling (e.g. by using the depth buffer) a second depth along a line from the previous observation point through the sampling point and calculating a position of a second depth point that corresponds to the second depth. The second depth point is used for evaluating a culling criterion dependent on a relationship between a distance from the second depth point to the sampling point and a distance from the second depth point to the tested point. Based on the evaluation of the culling criterion, the tested point is deemed to be culled for the visualizing of the tested frame.

By way of example, the culling criterion provides for deeming the tested point to be culled for the visualizing of the tested frame if the distance from the second depth point to the sampling point is shorter than the distance from the second depth point to the tested point multiplied by an aggressiveness factor. The aggressiveness factor defines an aggressiveness with which tested points are culled. For example, the computer-implemented method comprises a setting of the aggressiveness factor, e.g. to provide a trade-off between computation capacity and reasonable representation of the point cloud. The larger the aggressiveness factor, the more points are "falsely" culled (i.e. more points of the point cloud that are not occluded from the observation point associated to the tested frame are culled). Lower values of the aggressiveness factor will make the culling more conservative, to the limit of the aggressiveness factor being zero where no points will be culled. The factor may be fixed or settable by a user, e.g. wherein a user is free to define a custom value or wherein a set of fixed selectable values is provided to the user. In particular, the aggressiveness factor is less than ten. For example, the aggressiveness factor is 1, i.e. such that if the distance from the second depth point to the sampling point is shorter than the distance from the second depth point to the tested point, the tested point is deemed to be culled for the visualizing of the tested frame.

By way of example, occluded points are culled by assigning them a position outside of an observation point frustum associated with the tested frame.

In one embodiment, the sampling of the first depth and/or the calculating of the first depth point comprises biasing (e.g. shifting the position for the purpose of the calculation of the above-described steps) the tested point in depth or (e.g. lateral) position. For example, such a biasing provides for mitigating numerical precision issues. In particular, a biasing by less than five point diameters, more particularly less than two point diameters is used.

In a further embodiment, the occlusion culling testing further comprises calculating a position of a further sampling point, wherein the position of the further sampling point is a position of the tested point shifted towards the observation point associated with the tested frame, e.g. by one point diameter, and the first depth point lies on a line from the previous observation point to the further sampling point.

In a further embodiment, the depth buffer is a hierarchical depth buffer, e.g. wherein the method comprises generating the hierarchical depth buffer at the end of occlusion culling testing of each frame.

In particular, the occlusion culling testing further comprises calculating a mip level to use when sampling the first and the second depth, such that the hierarchical depth buffer is sampled at the lowest mip level where a single texel in the depth texture is large enough to contain the entire tested point. For example, the mip level is given as log 2 of a screen point size used for the visualizing of the tested frame, rounded up to the closest integer.

In a further embodiment, the sampling of the first depth and the calculating of the first depth point is carried out by using a model-view-projection matrix from the previous frame.

In particular, the method comprises calculating a screen position and a calculated depth of the tested point by using the model-view-projection matrix from the previous frame. The screen position is used for sampling the first depth, wherein the tested point is determined to be occluded or visible when viewed from the previous observation point based on a criterion comparing the first depth point and the calculated depth of the tested point. By way of example, to sample the depth from the previous frame, a so-called screen coordinate of the tested point is calculated using the model-view-projection matrix from the previous frame, wherein the screen coordinate is a 3D coordinate where two of the components represent the screen position of the tested point and are used for sampling the depth texture, while the third component is the depth that is compared against in the occlusion culling testing.

In a further embodiment, the heuristic testing is skipped if the tested point is determined to be visible when viewed from the previous observation point.

In a further embodiment, the tested point to be visible for the visualizing of the tested frame if the tested point is determined to be visible when viewed from the previous observation point.

In a further embodiment, the occlusion culling testing is performed in a vertex shader. By way of example, the occlusion culling testing is performed for each individual point of the point cloud in the vertex shader, e.g. compared to performing occlusion culling testing per section of the point cloud when issuing draw calls.

In a further embodiment, the occlusion culling testing is performed on individual points or groups of points of the point cloud in a compute shader, e.g. by creating lists of points to be rendered by the compute shader, wherein tested points of the point cloud to be culled for the visualizing of the tested frame are excluded from the lists.

In a further embodiment, the method comprises visualizing of the tested frame based on performing the occlusion culling testing for each point of the point cloud. By way of example, by performing the occlusion tests at a per point level, it no longer relevant how the points are grouped and gaps in occluding geometry will only prevent occlusion of individual points rather than entire sections.

In a further embodiment, the method comprises a rasterization step and a fragment shader step, wherein the rasterization step and the fragment shader step are skipped for the tested point if the tested point is deemed to be culled for the visualizing of the tested frame. Thus, for example, while with the inventive approach the cost of evaluating the vertex shader may still incur, the rasterization and fragment shader steps (where overdraw is relevant) can be skipped for culled points.

The disclosure further relates to a computer program product comprising program code having computer-executable instructions for performing the method according to any of the embodiments described above.

While the above-described technique is particularly beneficial for rendering of point clouds, the describe occlusion culling testing can also be applied to rendering of triangle meshes. By way of example, in that context the occlusion culling testing would then be performed at an object level, rather than in the vertex shader.

The disclosure thus further also relates to a computer-implemented method and a computer program product that essentially comprises the steps described above, but adapted to render a mesh model, e.g. a digital model provided by a triangle mesh, instead of a point cloud. By way of example, such an adaption is based on a computer-implemented method for visualizing different frames of a mesh model, e.g. provided by a triangle mesh, using a computing device having limited memory. Each of the different frames represents the mesh model as seen from a corresponding observation point, wherein the method comprises occlusion culling testing of points of the mesh model to determine which points of the mesh model should be culled for the visualizing of the frames. For a point of the mesh model (tested point) tested by the occlusion culling testing with respect to visualizing of one of the frames (tested frame) the occlusion culling testing comprises using a depth buffer providing depth information from a previous frame for sampling a first depth from a previous observation point associated with the previous frame towards the tested point to determine whether the tested point was visible or occluded when viewed from the previous observation point.

If the tested point is determined to be occluded when viewed from the previous observation point, the occlusion culling testing comprises carrying out a heuristic testing that comprises: (i) calculating a position of a first depth point that corresponds to the first depth; (ii) calculating a position of a sampling point on a line from the observation point associated with the tested frame to the tested point, wherein a distance from the tested point to the sampling point equals a distance from the tested point to the first depth point multiplied by a factor between 0.75 and 1.25; (iii) sampling a second depth along a line from the previous observation point through the sampling point and calculating a position of a second depth point that corresponds to the second depth; and (iv) deeming the tested point to be culled for the visualizing of the tested frame based on a culling criterion dependent on a relationship between the distance from the second depth point to the sampling point and the distance from the second depth point to the tested point.

BRIEF DESCRIPTION OF THE DRAWINGS

The method and computer program product according to the different aspects are described or explained in more detail below, purely by way of example, with reference to working examples shown schematically in the drawing. Identical elements are labelled with the same reference numerals in the figures. Specifically.

DETAILED DESCRIPTION

Figure 1:
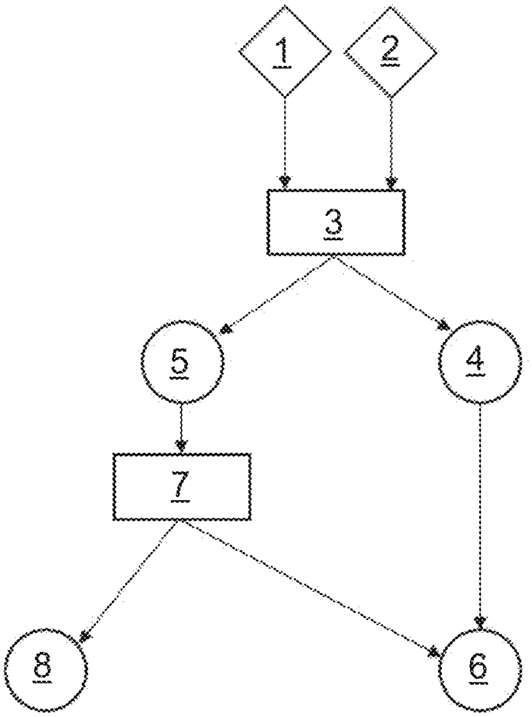
FIG. 1: schematically depicts the main steps of an embodiment of the computer-implemented.

FIG. 1 schematically depicts the main steps of an embodiment of the computer-implemented. The method relies on depth information from a previous frame, e.g. the immediately preceding frame when changing observation points, to predict whether points of the point cloud are occluded in the current frame. At the end of each frame, a depth buffer 1, e.g. a hierarchical depth buffer, is generated from the scene depth. The depth buffer 1 is then provided to a later frame (e.g. the immediately next frame) along with copies of the model-view-projection matrices 2 of the point cloud sections.

Based on the depth buffer 1 and the model-view-projection matrices 2, a first depth sampling 3 is carried out to check whether a tested point was visible 4 or occluded 5 when viewed from the previous observation point. By way of example, the vertex shader for each point of a point cloud section to be rendered first checks if the point would be visible from the point of view of the camera (the observation point) in the previous frame. If the point was visible 4, it is still treated as visible 6. If the point lies outside the view frustum of the previous frame, the point is treated as not occluded (i.e. visible). If the point was occluded 5, a heuristic secondary test 7 is performed to determine if the change in camera position since last frame is likely to have revealed the point, such that it can newly be treated as visible 6. If not, the point is culled 8.

Figure 2:
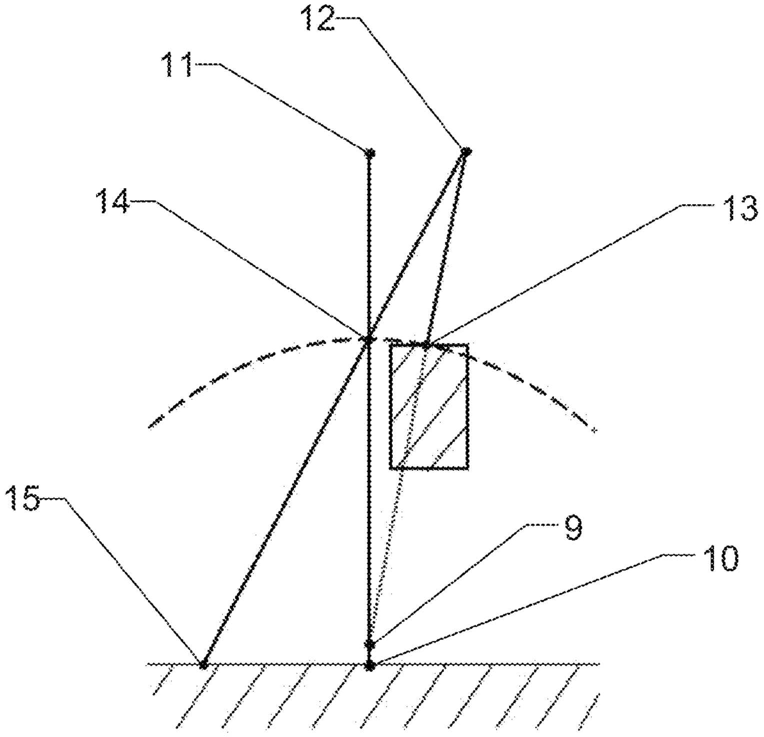
FIG. 2: schematically depicts the parameters determined or checked in an embodiment of the heuristic secondary test depicted by FIG. 1.

FIG. 2 schematically depicts the parameters determined or checked in an embodiment of the heuristic secondary test 7 depicted by FIG. 1. For example, the heuristic testing is initiated by calculating the mip level to use when sampling the depth buffer, e.g. wherein this is given as log 2 of the screen point size, rounded up to the closest integer.

Then the position for a first sampling point 9 is calculated, wherein the first sampling point 9 is given as the original position of the tested point 10, shifted one point diameter towards the current frame observation point 11 (e.g. camera position). By way of example, this shift (i.e. the first sampling point 9) is used to avoid self-occlusion.

In a next step, the screen coordinates and depth of the tested point 10 for the previous frame with its previous observation point 12 are calculated using the model-view-projection matrix from the previous frame. If the tested point lies outside the view frustum of the previous frame, the point is treated as not occluded, and the following steps are skipped.

The depth buffer is sampled using the last frame screen coordinates. If the sampled depth is higher than the calculated depth, the tested point is assumed not to be occluded, and the following steps are skipped.

Next steps include calculating a position of a first depth point 13 corresponding the sampled depth, and the distance between this first depth point 13 and the first sampling point 9. A position of a second sampling point 14 is calculated, wherein the position of the second sampling point 14 is given as the original position of the tested point 10, shifted towards the current frame observation point 11 by an amount that equals the distance between the tested point 10 and the first depth point 13. The depth buffer is sampled at the position of the second sampling point 14 to calculate the position of a second depth point 15 corresponding to the sampled depth.

If the position of the second depth point 15 calculated from the second depth sample lies closer to the position of the second sampling point 14 than to the position of the tested point 10, the tested point 10 is deemed to be occluded. In the example shown, however, the tested point 10 is now visible from the current observation point 11, which is also the result of the heuristic test because the distance from the second depth point 15 is closer to the tested point 10 than to the position of the second sampling point 14 (e.g. by assuming an aggressiveness factor of one).

Although aspects are illustrated above, partly with reference to some preferred embodiments, it must be understood that numerous modifications and combinations of different features of the embodiments can be made. All of these modifications lie within the scope of the appended claims.

The invention claimed is:

1. A computer-implemented method for visualizing different frames of a point cloud using a computing device having limited memory, each of the different frames representing the point cloud as seen from a corresponding observation point, wherein the method comprises occlusion culling testing of points of the point cloud to determine which points of the point cloud should be culled for the visualizing of the frames, wherein for a point of the point cloud, tested point, tested by the occlusion culling testing with respect to visualizing of one of the frames, tested frame, the occlusion culling testing comprises: using a depth buffer providing depth information from a previous frame for sampling a first depth from a previous observation point associated with the previous frame towards the tested point to determine whether the tested point was visible or occluded when viewed from the previous observation point, wherein, if the tested point is determined to be occluded when viewed from the previous observation point, the occlusion culling testing comprises carrying out a heuristic testing comprising: calculating a position of a first depth point that corresponds to the first depth, calculating a position of a sampling point on a line from the observation point associated with the tested frame to the tested point, wherein a distance from the tested point to the sampling point equals a distance from the tested point to the first depth point multiplied by a factor between 0.75 and 1.25, sampling a second depth along a line from the previous observation point through the sampling point and calculating a position of a second depth point that corresponds to the second depth, and deeming the tested point to be culled for the visualizing of the tested frame based on a culling criterion dependent on a relationship between a distance from the second depth point to the sampling point and a distance from the second depth point to the tested point.

2. The method according to claim 1, wherein the sampling of the first depth and/or the calculating of the first depth point comprises biasing the tested point in depth or position, particularly a biasing by less than five point diameters, more particularly less than two point diameters.

3. The method according to claim 2, wherein the occlusion culling testing further comprises calculating a position of a further sampling point, wherein the position of the further sampling point is a position of the tested point shifted towards the observation point associated with the tested frame, particularly by one point diameter, and the first depth point lies on a line from the previous observation point to the further sampling point.

4. The method according to claim 1, wherein the depth buffer is a hierarchical depth buffer, particularly wherein the method comprises generating the hierarchical depth buffer at an end of the occlusion culling testing of each frame.

5. The method according to claim 4, wherein the occlusion culling testing further comprises calculating a mip level to use when sampling the first and the second depth, such that the hierarchical depth buffer is sampled at a lowest mip level where a single texel in a depth texture is large enough to contain the entire tested point, wherein the mip level is given as log 2 of a screen point size used for the visualizing of the tested frame, rounded up to a closest integer.

6. The method according to claim 1, wherein the sampling of the first depth and the calculating of the first depth point is carried out by using a model-view-projection matrix from the previous frame.

7. The method according to claim 6, comprising calculating a screen position and a calculated depth of the tested point by using the model-view-projection matrix from the previous frame, and using the screen position for the sampling of the first depth, wherein the tested point is determined to be occluded or visible when viewed from the previous observation point based on a criterion comparing the first depth point and the calculated depth of the tested point.

8. The method according to claim 1, wherein the heuristic testing is skipped if the tested point is determined to be visible when viewed from the previous observation point.

9. The method according to claim 1, comprising deeming the tested point to be visible for the visualizing of the tested frame if the tested point is determined to be visible when viewed from the previous observation point.

10. The method according to claim 1, wherein the occlusion culling testing is performed in a vertex shader.

11. The method according to claim 1, wherein the occlusion culling testing is performed on individual points or groups of points of the point cloud in a compute shader, particularly by creating lists of points to be rendered by the compute shader, wherein tested points of the point cloud to be culled for the visualizing of the tested frame are excluded from the lists.

12. The method according to claim 1, comprising the visualizing of the tested frame based on performing the occlusion culling testing for each point of the point cloud.

13. The method according to claim 1, comprising a rasterization step and a fragment shader step, wherein the rasterization step and the fragment shader step are skipped for the tested point if the tested point is deemed to be culled for the visualizing of the tested frame.

14. The method according to claim 1, wherein the culling criterion provides for deeming the tested point to be culled for the visualizing of the tested frame if the distance from the second depth point to the sampling point is shorter than the distance from the second depth point to the tested point multiplied by an aggressiveness factor.

15. The method according to claim 14, wherein the aggressiveness factor is less than 10.

16. The method according to claim 14, wherein the aggressiveness factor is 1.

17. A computer program product comprising program code having computer-executable instructions stored on a non-transitory machine-readable medium for performing the method according to claim 14.

18. A computer program product comprising program code having computer-executable instructions stored on a non-transitory machine-readable medium for performing the method according to claim 1.

19. A computer-implemented method for visualizing different frames of a mesh model using a computing device having limited memory, each of the different frames representing the mesh model as seen from a corresponding observation point, wherein the method comprises occlusion culling testing of points of the mesh model to determine which points of the mesh model should be culled for the visualizing of the frames, wherein for a point of the mesh model, tested point, tested by the occlusion culling testing with respect to visualizing of one of the frames, tested frame, the occlusion culling testing comprises: using a depth buffer providing depth information from a previous frame for sampling a first depth from a previous observation point associated with the previous frame towards the tested point to determine whether the tested point was visible or occluded when viewed from the previous observation point, wherein, if the tested point is determined to be occluded when viewed from the previous observation point, the occlusion culling testing comprises carrying out a heuristic testing comprising: calculating a position of a first depth point that corresponds to the first depth, calculating a position of a sampling point on a line from the observation point associated with the tested frame to the tested point, wherein a distance from the tested point to the sampling point equals a distance from the tested point to the first depth point multiplied by a factor between 0.75 and 1.25, sampling a second depth along a line from the previous observation point through the sampling point and calculating a position of a second depth point that corresponds to the second depth, and deeming the tested point to be culled for the visualizing of the tested frame based on a culling criterion dependent on a relationship between a distance from the second depth point to the sampling point and a distance from the second depth point to the tested point.

20. A computer program product comprising program code stored on a non-transitory computer-readable medium having computer-executable instructions for performing the method according to claim 19.

* * * * *